July 2, 1957     H. F. KELLER     2,797,519
ARTIFICIAL LURE
Filed Dec. 14, 1955
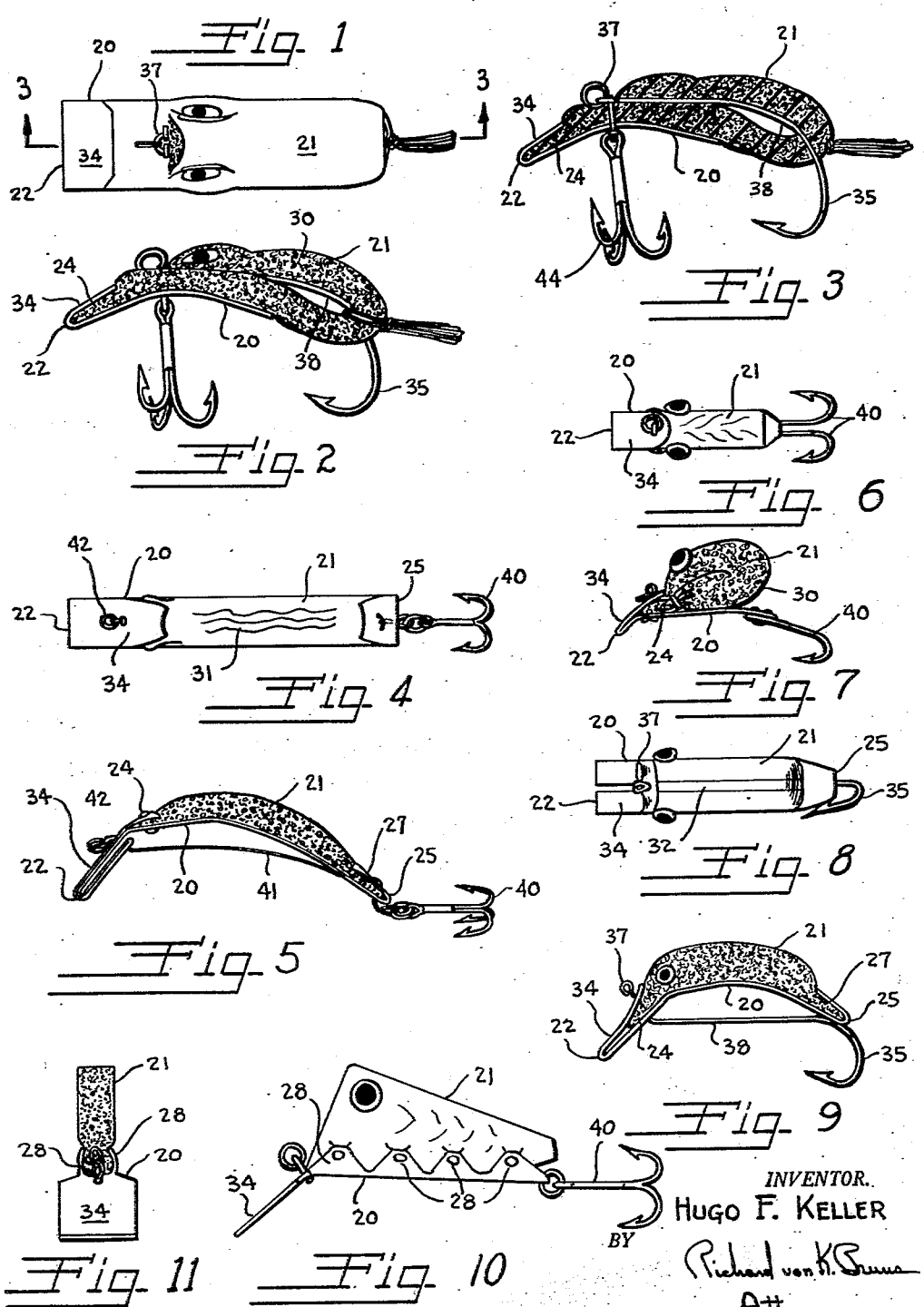
INVENTOR.
HUGO F. KELLER
BY
Attorney United States Patent Office 2,797,519
Patented July 2, 1957

2,797,519

ARTIFICIAL LURE

Hugo F. Keller, Oneida, N. Y.

Application December 14, 1955, Serial No. 553,004

2 Claims. (Cl. 43—42.06)

This invention relates generally to artificial fish lures, and has particular reference to an improved lure construction which is very inexpensive to produce and yet affords broad possibilities with regard to the type of bait simulated and the manner in which the lure can be used.

Broadly stated, the invention contemplates a lure construction which is essentially comprised of a bendable or pliable metal base member and a porous, resilient body member of some material such as sponge rubber, the two members being either detachably or permanently secured together by novel attachment means. The unlike materials of the base and body members result in a lure that is considerably more versatile than lures formed of a single material, but heretofore it has always been a problem to secure such materials together in a satisfactory manner. This problem is solved in the present invention by bending a portion of the base member into clamping engagement with the resilient body member by means of an inexpensive forming operation, the manner of attachment permitting the body member to be fastened to the base member in a variety of different ways and at the same time insuring secure engagement of the parts in every case.

Accordingly, with the foregoing and other considerations in view, it is the primary object of the present invention to provide an improved artificial fish lure construction which is inexpensive to produce and yet lends itself to a wide variety of different shapes and types of simulated baits.

Another important object of the invention is to provide an improved lure construction which is extremely versatile as to operation, the lure being useful as either a surface or underwater lure and being adjustable to produce variations in its swimming pattern.

A further important object of the invention is to provide an improved lure construction wherein the base portion of the lure is formed of pliable metal and the body portion of the lure is formed of sponge rubber or the like, the two portions being secured together by bending the former into clamping engagement with the latter.

Still another important object of the invention is to provide an improved lure construction wherein a number of body members of different bait simulating types can, if desired, be used interchangeably with a single base member.

A still further object of the invention is to provide an improved lure construction which is compact and lightweight and at the same time is very strong and durable.

A more specific object of the invention is to provide an improved lure construction having means therein to receive and retain a substance emitting a fish attracting scent.

Other objects and advantages of the invention will become apparent from the following detailed description thereof read in conjunction with the accompanying drawings which illustrate preferred embodiments of the invention for the purpose of disclosure.

In the drawings:

Figure 1 is a top plan view of one type of bait simulating lure embodying the invention;

Figure 2 is a side elevation of the lure shown in Figure 1;

Figure 3 is a vertical section taken along line 3—3 of Figure 1;

Figure 4 is a top plan view of another type of bait simulating lure embodying the invention;

Figure 5 is a side elevation of the lure shown in Figure 4;

Figure 6 is a top plan view of still another type of bait simulating lure embodying the invention;

Figure 7 is a side elevation of the lure shown in Figure 6;

Figure 8 is a top plan view of still another type of bait simulating lure embodying the invention;

Figure 9 is a side elevation of the lure shown in Figure 8;

Figure 10 is a side elevation of still another type of bait simulating lure embodying the invention; and Figure 11 is a front end elevation of the lure shown in Figure 10.

Having reference now to the drawings wherein like reference numbers designate the same part in all the views, each of the lures disclosed herein is essentially comprised of a base member 20 and a body member 21 secured to the base member in a manner to be presently described. Base member 20 is in the form of a sheet metal strip of some bendable or pliable metal such as aluminum or copper, while body member 21 is preferably formed of sponge rubber or of a porous, resilient plastic. The body member will also be in strip form in most instances, although it may be bent, rolled or otherwise distorted when it is attached to the base member to simulate bait of different shapes and sizes.

The base and body members 20 and 21 of each lure are secured together by bending a portion of the base member into clamping engagement with the body member by means of a simple automatic or manual forming operation. In the lures shown in Figures 1–3, 6 and 7, the base member 20 is bent back upon itself at 22 adjacent its front end, and the front end portion 24 of the body member 21 is clamped securely between the fold. In the lures shown in Figures 4, 5, 8 and 9, the base member 20, in addition to being bent at 22 to engage the front end portion of the body member, is also bent or folded back upon itself at 25 adjacent its rear end to clampingly engage the rear end portion 27 of the body member. A slightly different clamping arrangement is shown in Figures 10 and 11 wherein the base member 20 is initially formed with a plurality of pointed tab elements 28 projecting outwardly from its longitudinal edges, and these elements are bent into engagement with the lower edge of the body member 21 to secure the parts together as is best shown in Figure 11.

The clamping arrangements just described eliminate the need for adhesives, which in the past have not proved to be particularly satisfactory for uniting unlike materials such as metal and sponge rubber, and, at the same time, are very much less complicated than the mechanical securing arrengements which have been developed previously to avoid the use of an adhesive. Furthermore, the elimination of the adhesive, plus the ready pliability of the metal, enables a number of body members of different types to be used interchangeably with a single base member since the metal clamping means of the base member can be released or re-engaged as often as desired without breaking, and the operation can be easily performed with a conventional pair of pliers or the like.

As noted hereinabove, the sponge rubber body members 21 of the lures are also in strip form, the strips being cut from a sheet of material which is preferably substantially smooth surfaced and impervious on its top and bottom sides, and open-pored and pervious at its edges. The width and length of the strips will, of course, depend upon the type of bait the body member is intended to simulate. In the lures shown in Figures 1–3, 6 and 7, for example, the sponge rubber strip is fairly long but is bent double to produce a rounded body similar to the body of a mouse or the like, the ends of the strip being secured to the base member in the manner previously described. With this arrangement, the top and rear end of the body member 21 are smooth surfaced and impervious so that they can be suitably painted, while the sides or edges of the member are rough and porous as indicated at 30.

In Figures 4 and 5, the body member 21 is formed of a relatively long, thin strip that is intended to simulate a worm or small eel. In this modification, the top of the body member is again relatively smooth and impervious so that it can be painted as at 31, while the sides of the member are rough and pervious as indicated. A similar body conformation is shown in Figures 8 and 9, except that the body forming sponge rubber strip is somewhat shorter and thicker. In this modification, the top of the body is painted with stripes or other suitable markings as at 32. In the modification shown in Figures 10 and 11, the body member strip is relatively wide and is mounted vertically with respect to the base member to simulate a flat fish or the like. With this arrangement, the front, top and rear edges are rough and porous while the sides are relatively smooth and may be painted.

One of the reasons for not painting the sides or edges of the body member 21 and for providing them with a rough, pervious surface is so that the lure can be used as either an underwater or surface lure. Thus, if the body member is squeezed when it is immersed in the water, it will absorb the water through its pervious or porous surface area and become heavy enough for use as an underwater lure. On the other hand, if the lure body is not immersed in water and squeezed, its pores will continue to be filled with air and it will remain on the surface of the water. Another important reason for this construction is to enable the body member 21 to be impregnated with a substance having a fish attracting scent, such as liquid fish glue. This substance can be absorbed by the body and allowed to dry, and thereafter will not interfere with the further absorption of water if it is desired to use the lure as an underwater lure.

It will be noted from the figures of the drawing that each of the lures is provided with a substantially flat, obliquely disposed "nose" or front portion 34 which projects forwardly and downwardly from the main part of the lure. This nose portion is formed in each of the lures except that shown in Figures 10 and 11 by the bent or folded portion of the base member strip 20, and serves to produce a swimming or bobbing motion in the lure as it is pulled through the water. The swimming pattern may be accentuated or diminished by bending the pliable base member strip so that it has greater or less curvature, and this bending adjustment in no way interferes with or is inhibited by the resilient body member 21.

The lure construction disclosed herein lends itself to a variety of ways in which the hook may be secured thereto. In Figures 1–3, 8 and 9, for example, the hook 35 extends substantially the full length of the lure, the eye 37 on the hook serving as the attachment eye for the lure. This arrangement relieves the body of the lure of any strain, and the hook shank 38 can be concealed within the body as shown in Figures 1–3 or pass beneath the body and base members as shown in Figures 8 and 9. In the remaining figures of the drawing, a single or gang type hook 40 is rigidly or pivotally secured directly to the rear end of the base strip member, any strain on the hook being transmitted through the base strip rather than through the body member 21. Since the lure shown in Figures 4 and 5 is a relatively light, flexible lure, an added strain relieving member is provided in the form of a steel wire 41 which extends between the eye 42 of the lure and the hook. Additional single or gang type hooks may, of course, be attached to all of the lures illustrated in the same manner that the forward hook 44 is secured to the lure of Figures 1–3.

From the foregoing description, it will be apparent that the invention disclosed herein provides a novel and highly practical artificial fish lure construction, the construction shown being very inexpensive to produce and at the same time being extremely versatile with respect to the type of lure body that can be simulated and the manner in which the lure can be used. The invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. In an artificial fish lure, a base member in the form of an elongated bendable metal strip, a resilient, porous bait simulating body member in strip form overlying said base member, said base member being folded back upon itself at each end thereof into overlying clamping engagement with opposite ends of said body member, a portion of said body member strip having a smooth liquid impervious surface and another portion of said member having a rough, porous surface adapted to receive a substance having a fish attracting scent, said base member including the folded portions thereof being bendable to various different positions to vary the swimming pattern of the lure, and a hook member fixed to the folded ends of said base member and extending beneath the underside thereof, said hook having an eye serving as the attachment eye for the lure.

2. In an artificial fish lure, a base member in the form of an elongated bendable metal strip, a resilient, porous bait simulating body member in strip form overlying said base member, said base member being turned back upon itself at each end thereof to provide a fold at each end having overlying clamping engagement with opposite ends of said body member, said base member normally having an arched profile with the fold at the forward end thereof forming a substantially flat, obliquely disposed motion-producing portion to produce a swimming action in the lure as it moves through the water, said obliquely disposed fold being bendable into different angular positions to vary the swimming pattern of the lure, a portion of said body member strip having a smooth liquid impervious surface and another portion of said member having a rough, porous surface adapted to receive a substance having a fish attracting scent, and a hook member having a shank extending through the fold at one end of said body member and fixed to the fold at the other end thereof.

References Cited in the file of this patent

UNITED STATES PATENTS

| | | |
|---|---|---|
| 2,129,245 | Stenstrom | Sept. 6, 1938 |
| 2,158,924 | Bouton | May 16, 1939 |
| 2,605,575 | Ebert | Aug. 5, 1952 |
| 2,627,135 | Franklin | Feb. 3, 1953 |
| 2,686,381 | Peterson | Aug. 17, 1954 |

FOREIGN PATENTS

| | | |
|---|---|---|
| 741,382 | France | Dec. 3, 1932 |
| 1,058,681 | France | Nov. 4, 1953 |